(12) United States Patent
 Tsuida

(10) Patent No.: US 8,519,324 B2
(45) Date of Patent: Aug. 27, 2013

(54) LASER PROJECTOR FOR PROJECTING AND DISPLAYING AN IMAGE BASED ON THE RASTER SCANNING OF A LASER BEAM

(75) Inventor: Shinji Tsuida, Tokyo (JP)

(73) Assignee: NEC Corporation, Tokyo (JP)

( * ) Notice: Subject to any disclaimer, the term of this patent is extended or adjusted under 35 U.S.C. 154(b) by 596 days.

(21) Appl. No.: 12/310,481

(22) PCT Filed: Jun. 21, 2007

(86) PCT No.: PCT/JP2007/062497
§ 371 (c)(1),
(2), (4) Date: Feb. 26, 2009

(87) PCT Pub. No.: WO2008/032485
PCT Pub. Date: Mar. 20, 2008

(65) Prior Publication Data
US 2009/0316243 A1    Dec. 24, 2009

(30) Foreign Application Priority Data
Sep. 15, 2006    (JP) .................... 2006-250324

(51) Int. Cl.
*H01J 3/14*    (2006.01)
*G06M 7/00*    (2006.01)
*G03B 21/26*    (2006.01)
*G03B 21/28*    (2006.01)

(52) U.S. Cl.
USPC ............ 250/235; 250/221; 353/37; 353/98

(58) Field of Classification Search
USPC .............. 372/109, 99; 359/196.1, 197.1, 359/201.1, 201.2, 202.1, 237, 238, 443, 449, 359/838, 850; 250/234, 235, 221, 559.29, 250/236; 348/195, 203, 205; 358/513, 514, 358/1.7, 474, 480, 482, 483; 353/37, 98, 353/99, 94
See application file for complete search history.

(56) References Cited

U.S. PATENT DOCUMENTS

| | | | | |
|---|---|---|---|---|
| 5,032,924 | A * | 7/1991 | Brown et al. | 348/759 |
| 6,426,781 | B1 * | 7/2002 | Lee | 348/754 |
| 6,800,844 | B2 * | 10/2004 | Kandori et al. | 250/234 |
| 6,937,372 | B2 * | 8/2005 | Kandori et al. | 359/198.1 |
| 7,182,263 | B2 * | 2/2007 | Li et al. | 235/462.36 |
| 2002/0162949 | A1 * | 11/2002 | Iwamoto et al. | 250/221 |
| 2005/0224967 | A1 * | 10/2005 | Brandenburg et al. | 257/737 |
| 2005/0231781 | A1 | 10/2005 | Nomura et al. | |

FOREIGN PATENT DOCUMENTS

| | | |
|---|---|---|
| JP | 63-298213 | 12/1988 |
| JP | 07-159711 | 6/1995 |
| JP | 2524140 | 1/1997 |
| JP | 09-230277 | 9/1997 |
| JP | 2003-131151 A | 5/2003 |

(Continued)

*Primary Examiner* — Pascal M Bui Pho
(74) *Attorney, Agent, or Firm* — Foley & Lardner LLP

(57) ABSTRACT

A laser projector displays an image based on raster scanning of a laser beam. The laser projector is capable of reliably detecting the deflection angle of a vibratory mirror used for horizontally scanning without the need for a light source other than a laser light source for displaying images even if the deflection angle is small, and also of accurately adjusting the deflection angle of the vibratory mirror to a predetermined deflection angle at the resonant frequency of the vibratory mirror without exceeding the predetermined deflection angle.

14 Claims, 10 Drawing Sheets

(56) References Cited

FOREIGN PATENT DOCUMENTS

| | | | |
|---|---|---|---|
| JP | 2004-053943 | A | 2/2004 |
| JP | 2004-110030 | A | 4/2004 |
| JP | 2005-241482 | A | 9/2005 |
| JP | 2005-305773 | A | 11/2005 |
| JP | 2006-220745 | A | 8/2006 |
| JP | 2006-243225 | A | 9/2006 |

* cited by examiner

Fig. 4(a) PRIOR ART
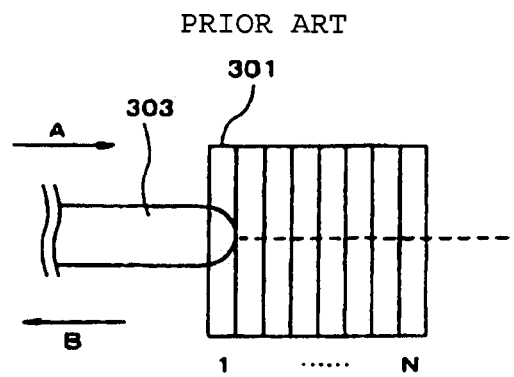
PRIOR ART
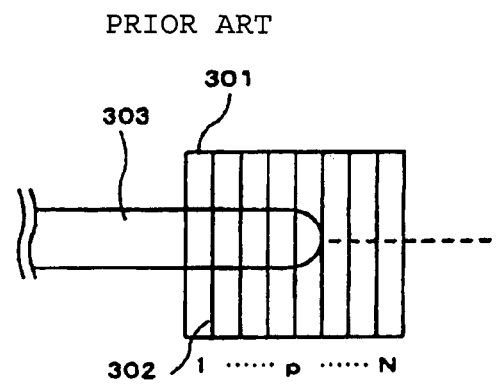
Fig. 4(b)
Fig. 5 PRIOR ART
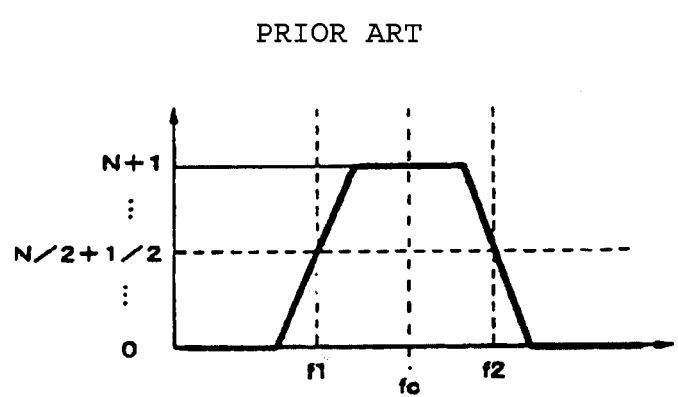

LASER PROJECTOR FOR PROJECTING AND DISPLAYING AN IMAGE BASED ON THE RASTER SCANNING OF A LASER BEAM

TECHNICAL FIELD

The present invention relates to a laser projector for projecting and displaying an image based on the raster scanning of a laser beam, and more particularly to a laser projector having a deflection angle adjusting function for a vibratory mirror for horizontally scanning a laser beam.

BACKGROUND ART

Some laser projectors for projecting and displaying an image based on the raster scanning of a laser beam have a high operating rate in the range from several tens kHz to 100 kHz for horizontally scanning and a high deflection angle represented by an optical angle of ±20° or greater. One approach for performing a scanning process with such a high operating rate and have a high deflection angle is to use a vibratory mirror which operates near a resonant point thereof.

The vibratory mirror can have a high deflection angle in a small operating frequency range near the resonant frequency thereof. However, if the operating frequency deviates from the resonant frequency, then the deflection angle of the vibratory mirror is extremely reduced. The resonant frequency depends on the material, shape, temperature, etc. of the vibratory mirror and tends to vary due to manufacturing variations and the operating temperature. To operate the vibratory mirror through a high deflection angle, therefore, it is necessary to keep the resonant frequency and the operating frequency as close to each other as possible. The vibratory mirror is thus adjusted to either bring the resonant frequency thereof close to the operating frequency or bring the operating frequency close to the resonant frequency thereof.

As the deflection angle becomes greater, the vibratory mirror is more likely to fail to operate. When the vibratory mirror is to operate through a high deflection angle, it is desirable to control the vibratory mirror such that its deflection angle will not exceed a prescribed deflection angle. When the vibratory mirror operates with its operating frequency deviating from the resonant frequency, then since the intensity of an input signal needs to be higher than when the vibratory mirror operates at the resonant frequency, a circuit for actuating the vibratory mirror undergoes an increased load.

In order to adjust the deflection angle to operate the vibratory mirror through a high deflection angle, it is desirable that the deflection angle of the vibratory mirror not exceed a predetermined deflection angle and that the vibratory mirror operate at the resonant frequency.

In order to adjust the deflection angle of the vibratory mirror, it is necessary to accurately detect the deflection angle of the vibratory mirror. According to a widely performed process of detecting the deflection angle of the vibratory mirror, a light sensor is used to detect the deflection angle of the vibratory mirror based on the timing at which a light beam passes through the light sensor.

For example, JP-A No. 2004-053943 (Patent document 1) discloses a technique wherein synchronism sensors are disposed respectively at the start and end points of the scanning stroke of the laser beam for detecting the deflection angle of a vibratory mirror, and the drive frequency of the vibratory mirror is corrected based on the detected results. A process of detecting and adjusting the deflection angle of the vibratory mirror as disclosed in Patent document 1 will be described below with reference to FIG. 1. FIG. 1(a) is a block diagram of a system for controlling a semiconductor laser and a movable mirror as disclosed in Patent document 1, and FIG. 1(b) is a timing chart of the amplitude of the movable mirror and drive pulses.

In FIG. 1(a), the reference numeral 901 represents drive pulse generator, 902 the movable mirror driver, 904 the synchronism detecting sensor, 905 the end detecting sensor, 906 the LD driver, 907 the clock pulse generator, 908 the phase synchronizer, 909 the magnification calculator, and 910 the amplitude calculator.

Drive pulse generator 901 frequency-divides a reference clock with a programmable frequency divider (not shown), to generate a pulse train ($T<T_0/4$) having a frequency which is twice drive frequency fd ($=1/T_0$) and a duty ratio of 50% or lower such that voltage pulses will be applied, one in a ½ period of a movable mirror, only during a period from a maximum amplitude level to a horizontal orientation, as shown in FIG. 1(b). Drive pulse generator 901 then delays the pulse train by phase delay δ with a PLL circuit, and applies the pulse train at drive frequency fd to movable mirror driver 902.

When the system is turned on or when the system is activated from a standby mode, the frequency-dividing ratio is continuously changed by the programmable frequency divider to vary drive frequency fd from a high frequency value and to drive the movable mirror at varying drive frequency fd. When the scanning angle is increased until the light beam is detected by synchronism detecting sensor 904, the system judges that the movable mirror operates in a resonant vibration band. At the same time, the system calculates a scanning angle based on the time difference between the start and end points of the scanning stroke, and sets the drive frequency such that the deflection angle (amplitude) of the movable mirror will be of a predetermined angle.

Japanese utility model No. 2524140 (Patent document 2) discloses a laser beam scanning device for scanning a laser beam wherein a scanning mirror is irradiated with an irradiating light beam at an incident angle which is different from the laser beam, and a line sensor is provided as photodetector means for detecting the irradiating light beam reflected from the scanning mirror. The line sensor detects the deflection angle of the scanning mirror, and the laser beam scanning device corrects the deflection angle of the scanning mirror beyond standard deviation.

FIG. 2 is a perspective view of the laser beam scanning device disclosed in Patent document 2. A process of detecting the deflection angle of the vibratory mirror as disclosed in Patent document 2 will be described below with reference to FIG. 2.

As shown in FIG. 2, main laser beam 210 from a laser oscillator (Nd:YAG laser oscillator or the like, not shown) is focused onto specimen surface 205 by mirror 203, scanning mirror 202 of galvanometer-type optical scanner (hereinafter referred to as "scanner") 201, and fθ lens 204, and is positioned by scanning mirror 202 as it is turned.

Main laser beam 210 is applied to scanning mirror 202 at an incident angle of 45° and folded by scanning mirror 202 through 95°, i.e., directed to fθ lens 204 at an exit angle of 135°.

Laser beam 211 emitted from semiconductor laser 206 is converted by collimator lens 207 into a parallel beam, which is applied to scanning mirror 202. The parallel beam is applied to scanning mirror 202 at an incident angle different from main laser beam 210, and is reflected from scanning mirror 202 at an angle different from the exist angle of main laser beam 210. The reflected laser beam is focused onto line sensor 209 by cylindrical lens 208.

When the deflection angle having a maximum amplitude of scanner 201 is changed due to the heating of scanner 201 itself during its operation, the focused position on line sensor 209 of laser beam 211 emitted from semiconductor laser 206 and reflected by scanning mirror 202 is also changed, resulting in a change in the positional information from line sensor 209. A signal for driving scanner 201 is corrected based on the positional information to position main laser beam 210 accurately.

Patent document 3 (JP-A No. 2005-241482) discloses a method of detecting the resonant frequency of a vibratory mirror mounted in a laser display device.

FIG. 3 is a perspective view schematically showing the laser display device disclosed in Patent document 3. The method of detecting the resonant frequency of the vibratory mirror mounted in the laser display device disclosed in Patent document 3 will be described below with reference to FIG. 3.

FIG. 3 shows photodetector (line sensor) 301, light source 401, deflecting means 402, emitted light beam 403, deflected light beams 404, 405, scanning line 410, second deflecting means 411, deflected light beam 412, shield 413, scanning area 414, scanning line path 415, and projection plane 420. In the laser display device shown in FIG. 3, emitted light beam 403 from light source 401, which is a laser, is two-dimensionally deflected by deflecting means 402 and second deflecting means 411 to display an image on projection plane 420.

FIG. 4(a) is a schematic diagram showing the manner in which the deflected light beam moves back and forth on photodetector 301 shown in FIG. 3, and FIG. 4(b) is a schematic diagram showing the manner in which the deflected light beam is deflected through a different deflection angle. As shown in FIG. 4, photodetector 301 as a line sensor is divided into a plurality of light detecting areas 302 that are successively numbered from the leftmost light detecting area "1" rightwardly up to "N". Reference numeral 303 represents an area scanned by the deflected light beam.

When the power supply of the laser display device is turned on, it starts a control process to fully energize light source 401. Then, the frequency of a signal applied to deflecting means 402 is set to a preset startup frequency, and the folding position of the deflected light beam at the frequency is detected by photodetector 301. Thereafter, the frequency is changed by preset steps. The frequency is changed and the folding position is detected repeatedly until a preset end frequency is reached.

It is assumed that when the folding position of the deflected light beam is in the leftmost light detecting area, then the folding position is detected as "1" (see FIG. 4(a)), and the folding position of the deflected light beam is in a pth area counted from the leftmost light detecting area, then the folding position is detected as "p" (see FIG. 4(p)). When the folding position goes beyond photodetector 301, i.e., when it is positioned rightwardly of photodetector 301, the folding position is detected as "N+1". Conversely, when the folding position falls short of photodetector 301, the folding position is detected as "0". The deflecting state of deflecting means 402 can be detected by thus detecting the folding positions on and near photodetector 301.

The relationship between frequencies of the signal applied to photodetector 402 and folding positions of the deflected light beam detected by photodetector 301 is shown as a graph in FIG. 5. Plotted points in the graph are in a substantially axisymmetric pattern, and the frequency at the axis of symmetry is calculated as resonant frequency fc. The frequency of a signal to be applied to photodetector 402 is determined based on the calculated frequency.

Patent document 1: JP-A No. 2004-053943
Patent document 2: Japanese utility model No. 2524140
Patent document 3: JP-A No. 2005-241482

DISCLOSURE OF THE INVENTION

Problems to be Solved by the Invention

However, the background art described above suffers the following problems:

According to the process of detecting the deflection angle of the vibratory mirror as disclosed in Patent document 1, if the operating frequency of the vibratory mirror is not the same as the resonant frequency, then the intensity of the input signal at the operating frequency has to be higher than if the vibratory mirror is operated at the resonant frequency, resulting in the problem of more power consumption. The reason is that the intensity of the input signal is preset to a high level to adjust the operating frequency so that the vibratory mirror will have a predetermined deflection angle by varying the operating frequency. This is because the intensity of the input signal needs to be high in order to equalize the interval scanned by the laser beam by at least the distance between the synchronism detecting sensor and the end detecting sensor.

The process of detecting the deflection angle of the vibratory mirror as disclosed in Patent document 2 is also problematic in that the number of parts used is too large to make the laser beam scanning device smaller in size and lower in cost. The reason is that the light source for detecting the deflection angle of the vibratory mirror has to be prepared separate by from the laser beam used to display images.

The method of detecting the resonant frequency of the vibratory mirror mounted in the laser projector device and the method of adjusting the operating frequency as disclosed in Patent document 3 are disadvantageous in that the deflecting interval of the laser beam cannot be adjusted accurately and it is difficult to adjust the resonant frequency of the vibratory mirror to a proper value in a short time when the resonant frequency is changed after the laser projector device has started to project images. One reason for this is that since the photodetector is disposed in a somewhat small area within the range of the deflection interval of the laser beam to be adjusted, it is difficult to obtain accurate information of the laser beam near the ends of the deflection interval of the laser beam to be adjusted, particularly accurate information as to the folding position of the deflected scanning light beam. According to another reason, it is necessary to change the drive frequency over a wide frequency range in order to detect the resonant frequency.

Furthermore, inasmuch as the laser beam has a high energy density level and hence is detrimental to the human body, in particular it tends to cause damage to the eyes, the laser beam needs to be projected while it is scanning properly. If the laser beam fails to scan properly due to a failure of the scanning mirror, then it is desirable to have a structure that is capable of instantaneously blocking the projection of the laser beam. However, the background art described above is not addressed to the above safety problem.

The present invention has been made in view of the above problems. It is an object of the present invention to provide a laser projector for displaying an image based on the raster scanning of a laser beam, in which the laser projector is capable of reliably detecting the deflection angle of a vibratory mirror used for horizontally scanning without the need for a light source other than a laser light source for displaying images even if the deflection angle is small, and also of accurately adjusting the deflection angle of the vibratory mirror to a predetermined deflection angle at the resonant frequency of the vibratory mirror without exceeding the predetermined deflection angle.

Means for Solving the Problems

A laser projector according to the present invention comprises a light source for emitting a laser beam, a modulator for modulating the intensity of the laser beam depending on an image to be projected, a vibratory mirror vibratable for horizontally deflecting the laser beam whose intensity has been modulated, a vertical scanning mirror for vertically deflecting the laser beam whose intensity has been modulated, a deflection angle detector for detecting a deflection angle of the vibratory mirror, and a deflection angle adjuster for adjusting the deflection angle of the vibratory mirror based on the detected deflection angle of the vibratory mirror, wherein the deflection angle detector includes a light detecting element array comprising a plurality of light detecting elements arrayed parallel to a horizontally scanning direction along which the laser beam is deflected by the vibratory mirror, the light detecting element array being disposed outside of an image projection area and disposed in a wide range including a horizontal scanning range of the laser beam.

The light detecting elements of the light detecting element array may not be arrayed at equally spaced intervals.

The light detecting elements of the light detecting element array should preferably be denser at the ends of the light detecting element array than at the center thereof.

The light detecting element array may comprise a semiconductor layer disposed on a transparent substrate.

The deflection angle adjuster may adjust the frequency and intensity of a drive signal for the vibratory mirror.

The deflection angle adjuster should preferably adjust the deflection angle of the vibratory mirror by bringing the frequency of the drive signal for the vibratory mirror into conformity with the resonant frequency of the vibratory mirror and thereafter by varying the intensity of the drive signal for the vibratory mirror.

When the deflection angle of the vibratory mirror is adjusted, the vertical scanning mirror may be fixed in orientation to cause the laser beam to horizontally scan the light detecting element array.

The deflection angle of the vibratory mirror should preferably be detected and adjusted by the deflection angle adjuster for each vertical blanking period.

A laser projector according to the present invention comprises a light source for emitting a laser beam, a modulator for modulating the intensity of the laser beam depending on an image to be projected, a vibratory mirror vibratable for horizontally deflecting the laser beam whose intensity has been modulated, a vertical scanning mirror for vertically deflecting the laser beam whose intensity has been modulated, a first deflection angle detector for detecting a deflection angle of the vibratory mirror, a first deflection angle adjuster for adjusting the deflection angle of the vibratory mirror based on the detected deflection angle of the vibratory mirror, a second deflection angle detector for detecting a deflection angle of the vertical scanning mirror, and a second deflection angle adjuster for adjusting the deflection angle of the vertical scanning mirror based on the detected deflection angle of the vertical scanning mirror, wherein the first deflection angle detector includes a first light detecting element array comprising a plurality of light detecting elements arrayed parallel to a horizontally scanning direction along which the laser beam is deflected by the vibratory mirror, the first light detecting element array being disposed outside of an image projection area and disposed in a wide range including a horizontal scanning range of the laser beam, and wherein the second deflection angle detector includes a plurality of light detecting elements disposed outside of the image projection area and disposed so as to cover a terminal end of a vertical scanning stroke of the laser beam.

The first light detecting element array of the first deflection angle adjuster and the light detecting elements of the second deflection angle adjuster should preferably comprise respective semiconductor layers disposed on one transparent substrate.

The first deflection angle detector should preferably include a second light detecting element array in addition to the first light detecting element array, the second light detecting element array being disposed outside of the image projection area and comprising a semiconductor layer disposed along an end of a horizontal scanning stroke of the laser beam and disposed on the transparent substrate.

A metal film deposited on the transparent substrate may be etched to form a projection opening therein for enabling the laser beam to pass therethrough.

According to the present invention, the light detecting element array for detecting and adjusting the deflection angle of the vibratory mirror for horizontal scanning is disposed parallel to the horizontal scanning direction of the laser beam and disposed in a range wider than the range of the deflection angle of the laser beam to be adjusted. According to the present invention, the laser projector is capable of detecting the deflection angle of the vibratory mirror for horizontal scanning even if it is small, without the need for a light source for detecting the deflection angle of the vibratory mirror, other than the laser light source used for displaying images. When the operating frequency of the vibratory mirror is adjusted to the resonant frequency thereof, the vibratory mirror is prevented from being broken due to being overdriven. If the prescribed deflection angle is not achieved, then no laser beam is projected from the laser projector. Accordingly, the laser projector is kept safe.

The light detecting elements for detecting the deflection angle of the vertical scanning mirror and the light detecting elements for detecting the deflection angle of the horizontal scanning vibratory mirror at the time that images are projected are fabricated on one component, e.g., a transparent substrate, in addition to the light detecting element array for detecting the deflection angle of the vibratory mirror. The deflection angle of the vertical scanning mirror and the deflection angle of the vibratory mirror at the time that images are projected can be detected without the need for an increased number of parts. When the deflection angle fails to be kept in a prescribed range under abnormal conditions, the laser projector is kept safe by instantaneously cutting off the laser beam.

Even after an image has started to be projected, the deflection angle of the vibratory mirror is detected and corrected for each interframe interval. Accordingly, the laser projector can keep projecting images with a stable deflection interval.

BRIEF DESCRIPTION OF THE DRAWINGS

FIG. 4(a) is a schematic diagram showing the manner in which a deflected light beam moves back and forth on a photodetector shown in FIG. 3;

FIG. 4(b) is a schematic diagram showing the manner in which the deflected light beam is deflected through a different deflection angle;

FIG. 5 is a graph showing the relationship between frequencies of a signal applied to a photodetector and folding positions of the deflected light beam detected by the photodetector in the laser display device shown in FIG. 3;

DESCRIPTION OF REFERENCE NUMERALS

Figure 1A:
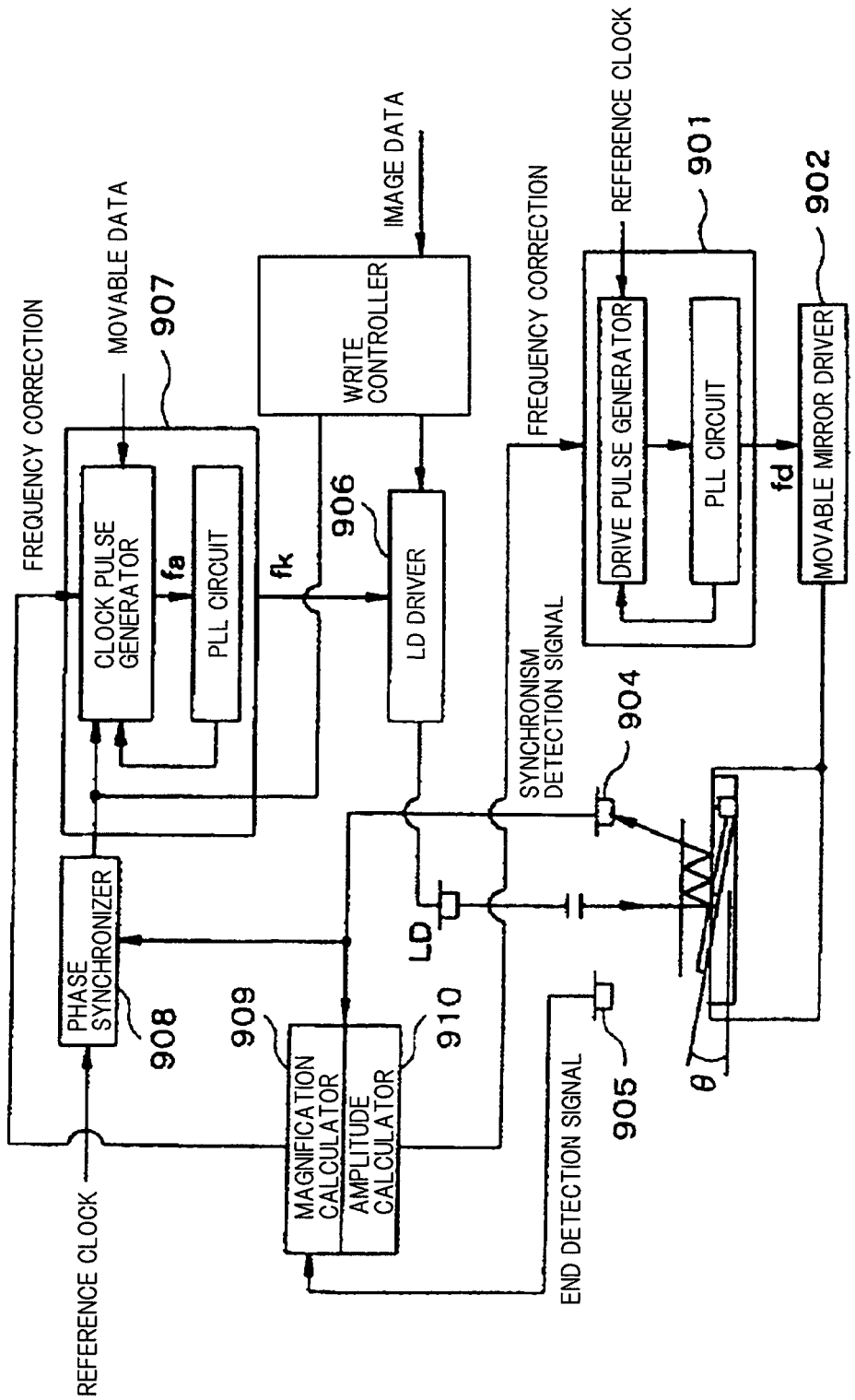
FIG. 1(a) is a block diagram of a system for controlling a semiconductor laser and a movable mirror as disclosed in Patent document 1.
Figure 1B:
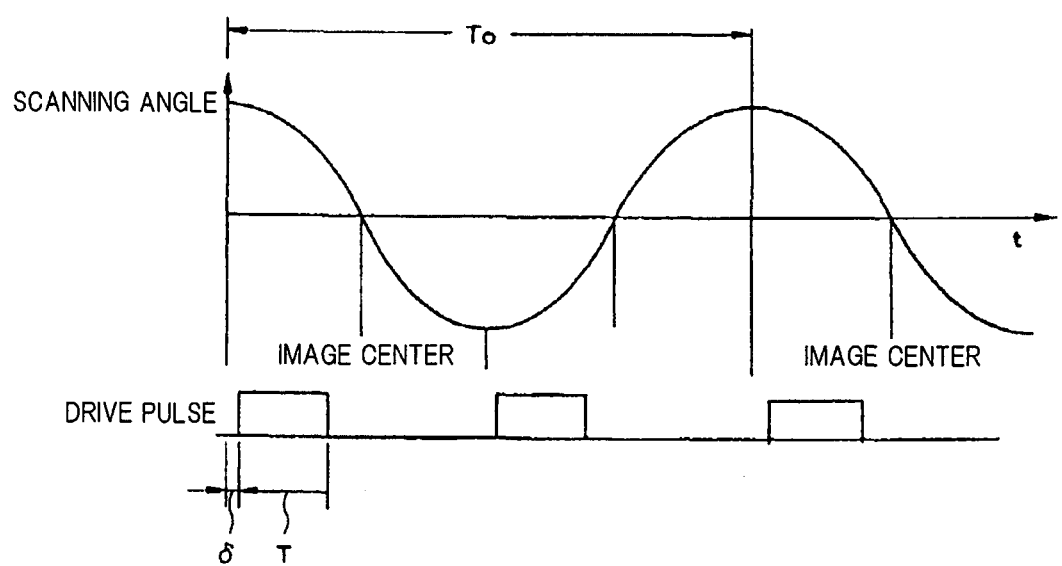
FIG. 1(b) is a timing chart of the amplitude of the movable mirror and drive pulses.
Figure 2:
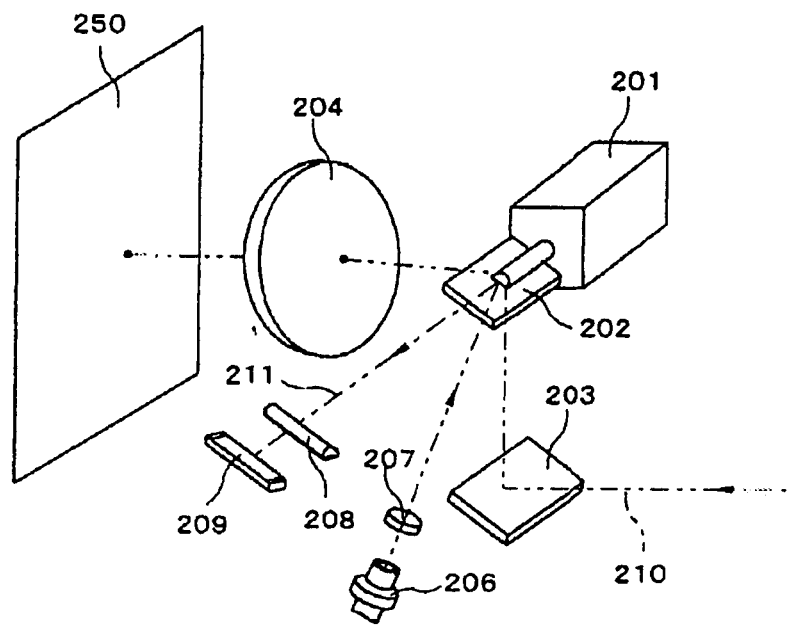
FIG. 2 is a perspective view of a laser beam scanning device disclosed in Patent document 2.
Figure 3:
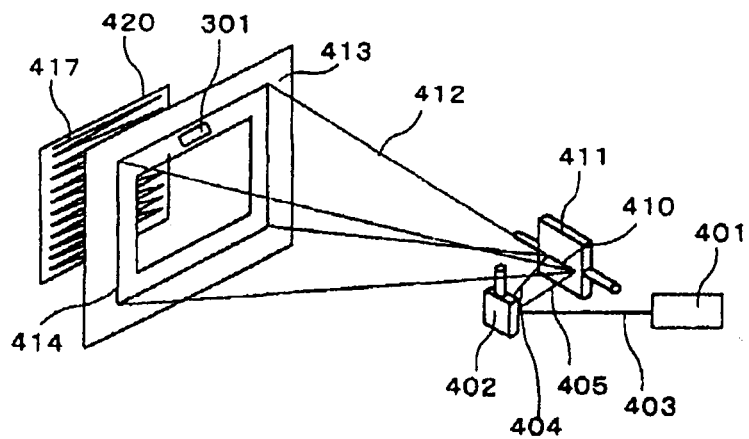
FIG. 3 is a perspective view schematically showing a laser display device disclosed in Patent document 3.

11: semiconductor laser
12: condensing lens
13: modulator
14: collimator lens
21: horizontal scanning mirror
22: vertical scanning mirror
30: frame
32: light detecting element array
33: PIN photodiode
34: vertical scanning light detecting element
35, 36: horizontal scanning light detecting element
26: FPC
40: projection opening
41: scanning area
42: projecting area
51: control circuit
52: laser driver
53: video signal processing circuit
54: horizontal scanning mirror driver
55: vertical scanning mirror driver
56: deflection angle detecting circuit
111: semiconductor laser
112: condensing lens
113: modulator
114: collimator lens
115: dichroic mirror

BEST MODE FOR CARRYING OUT THE INVENTION

Figure 6:
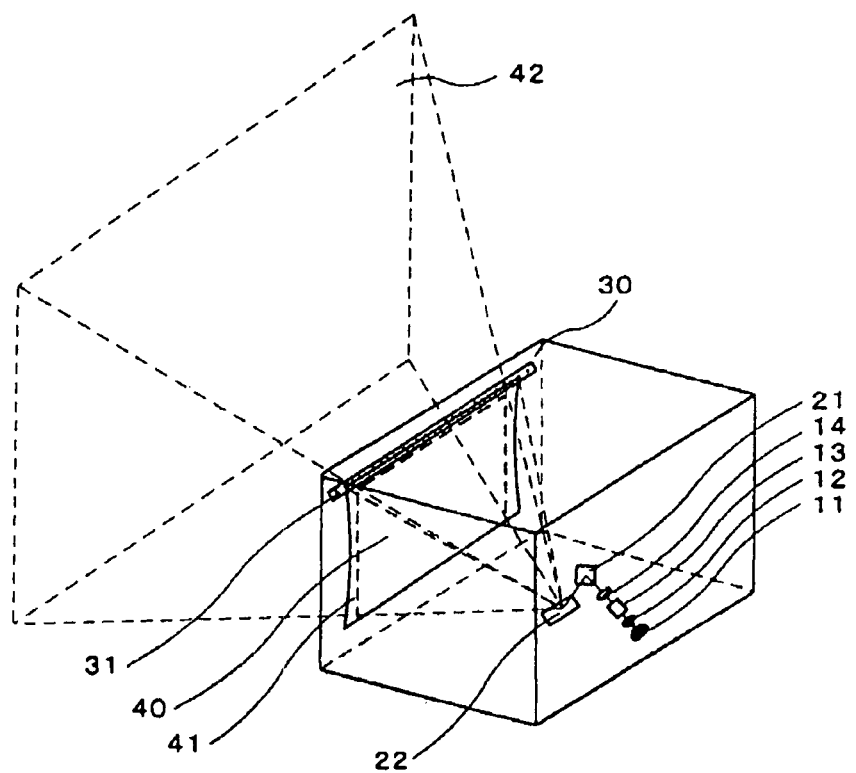
FIG. 6 is a perspective view showing the structure of a laser projector according to a first exemplary embodiment of the present invention.
Figure 7:
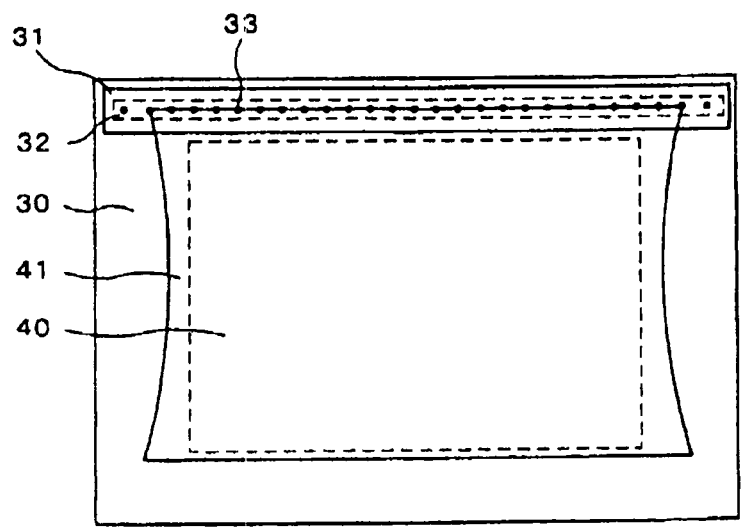
FIG. 7 is a plan view of a projection opening frame of the laser projector shown in FIG. 6, as viewed from within the laser projector.

Exemplary embodiments of the present invention will be described in detail below with reference to the accompanying drawings. FIG. 6 is a perspective view showing the structure of a laser projector according to a first exemplary embodiment of the present invention. FIG. 7 is a plan view of a projection opening frame of the laser projector shown in FIG. 6, as viewed from within the laser projector.

As shown in FIG. 6, the laser projector according to the present exemplary embodiment comprises semiconductor laser 11 as a laser light source, condensing lens 12 for condensing a laser beam emitted from semiconductor laser 11, modulator 13 for being supplied with the laser beam condensed by condensing lens 12, and for modulating the intensity of the laser beam, and outputting the modulated laser beam, collimator lens 14 for converting the laser beam output from modulator 13 into a parallel laser beam, horizontal scanning mirror 21 comprising a vibratory mirror for receiving the parallel laser beam from collimator lens 14 and horizontally deflecting the parallel laser beam, and vertical scanning mirror 22 comprising a linear scanning mirror for vertically deflecting the horizontally deflected laser beam.

Within an area that is two-dimensionally scanned by the laser beam, modulator 13 controls the intensity of the laser beam representative of an image to be projected for thereby displaying an image on projecting area 42 through projecting opening 40. Horizontal scanning mirror 21, which is the vibratory mirror, deflects the laser beam reciprocally horizontally. When the frequency of the drive signal for horizontal scanning mirror 21 is brought into conformity with the inherent resonant frequency of horizontal scanning mirror 21, horizontal scanning mirror 21 can be deflected through a greater interval.

As shown in FIGS. 6 and 7, the laser projector according to the present exemplary embodiment is housed in frame 30 made of aluminum, for example. Frame 30 has projection opening 40 defined in a side wall thereof for emitting the laser beam from within the laser projector out of the laser projector. The laser beam scans scanning area 41 including projection opening 40. Projection opening 40 is of a rectangular shape, for example. Transparent substrate 31 made of glass, for example, is disposed along an upper edge of projection opening 40 in frame 30. An array of PIN photodiodes 33 each including a semiconductor layer in the form of an amorphous silicon film is disposed on transparent substrate 31. The array of PIN photodiodes 33 is patterned as light detecting element array 32 parallel to the horizontal scanning direction of the laser beam.

Figure 8:
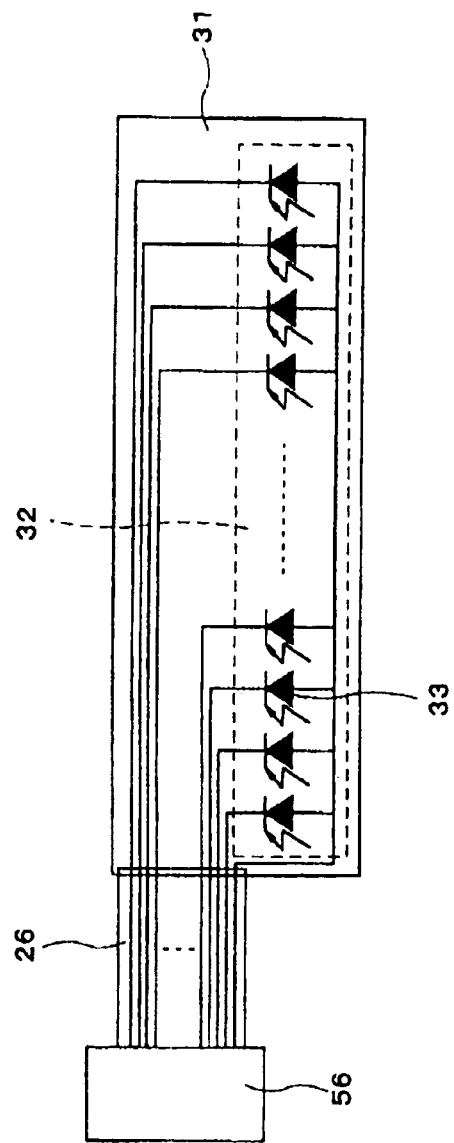
FIG. 8 is a schematic diagram showing connections between a light detecting element array shown in FIG. 7 and an external circuit.

FIG. 8 is a schematic diagram showing connections between the light detecting element array shown in FIG. 7 and an external circuit. As shown in FIG. 8, photodiodes 33 of light detecting element array 32 have respective anodes connected as a common electrode and respective cathodes independently connected through FPC (Flexible Printed Circuit) 36 to deflection angle detecting circuit 56.

Figure 9:
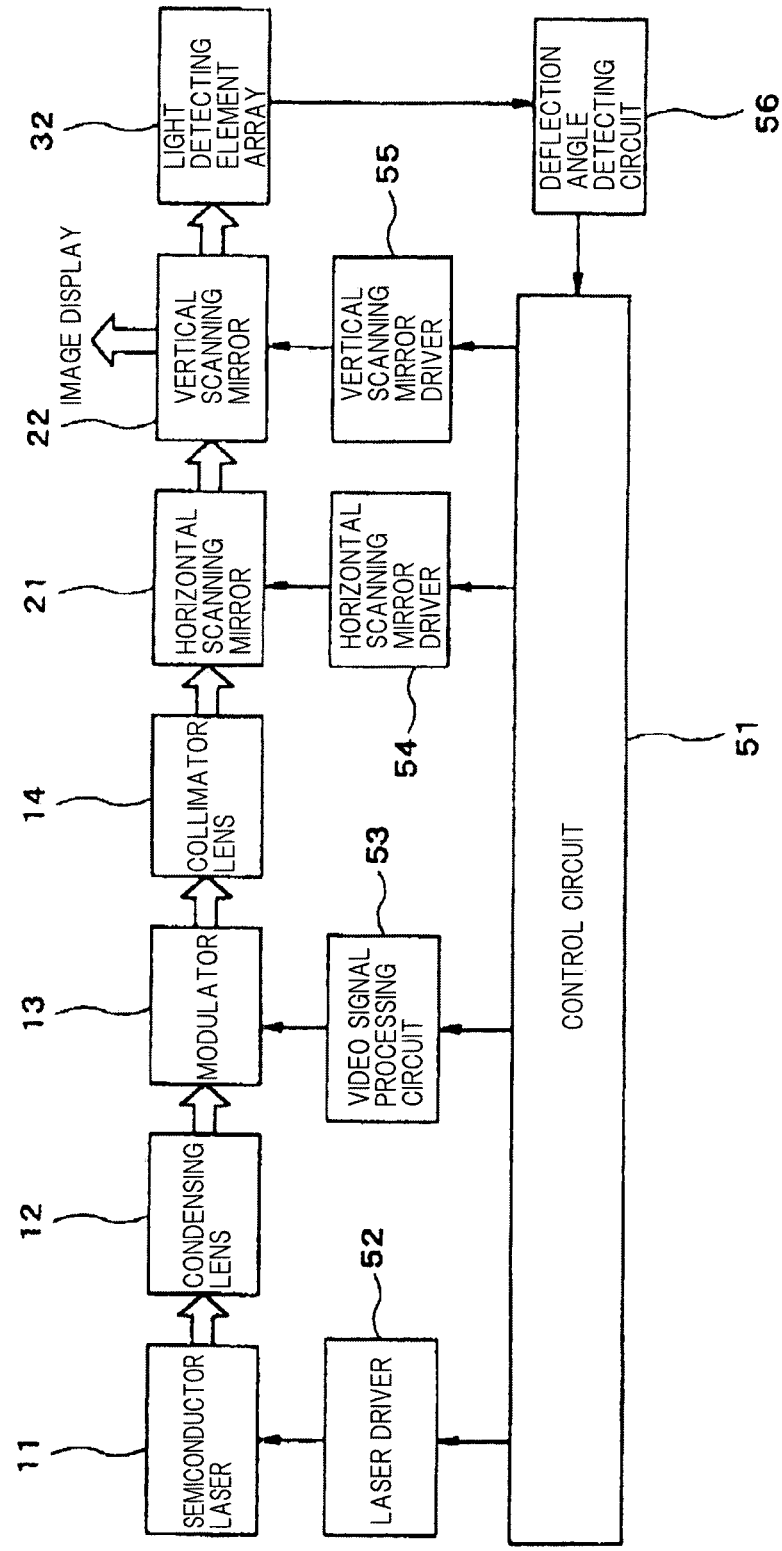
FIG. 9 is a block diagram of a system for controlling operation of the laser projector shown in FIG. 6.

FIG. 9 is a block diagram of a system for controlling operation of the laser projector shown in FIG. 6. As shown in FIG. 9, deflection angle detecting circuit 56 detects the deflection angle of horizontal scanning mirror 21 from information output by light detecting element array 32. Control circuit 51 acquires deflection angle information of horizontal scanning mirror 21 from deflection angle detecting circuit 56, and controls laser driver 52, video signal processing circuit 53, horizontal scanning mirror driver 54, and vertical scanning mirror driver 55. Laser driver 52 selectively turns on and off the laser beam output from semiconductor laser 11, and controls the laser beam to be output at a constant output level. Video signal processing circuit 53 inputs a signal to modulator 13 which controls the intensity of the laser beam to be output to horizontal scanning mirror 21. Horizontal scanning mirror driver 54 controls the frequency and intensity of a signal to be input to horizontal scanning mirror 21. Vertical scanning mirror driver 55 controls the intensity of a signal to be input to vertical scanning mirror 22.

Operation of the laser projector thus constructed according to the present exemplary embodiment will be described below. When the laser projector starts up, it is set to cause the laser beam to scan light detecting element array 32, as follows: The output signal from vertical scanning mirror driver 55 is controlled to fix the orientation of vertical scanning mirror 22 so as to cause the laser beam to scan light detecting element array 32.

Then, horizontal scanning mirror driver 54 starts the scanning movement of horizontal scanning mirror 21 with a signal intensity for preventing the deflection angle from exceeding the predetermined deflection angle even when the operating frequency of horizontal scanning mirror 21 and the resonant frequency thereof are brought into conformity with each other by horizontal scanning mirror driver 54. Laser driver 52 controls semiconductor laser 11 to start outputting the laser beam, and deflection angle detecting circuit 56 detects the deflection angle of horizontal scanning mirror 21 based on boundary information, from the output signal of light detecting element array 32, as to the boundary between an element which detects the laser beam and an element which does not defect the laser beam. While detecting the deflection angle of horizontal scanning mirror 21, the frequency of the drive signal input from horizontal scanning mirror driver 54 to horizontal scanning mirror 21 is changed. The drive frequency is adjusted to maximize the deflection angle of horizontal scanning mirror 21, thereby bringing the operating frequency into conformity with the resonant frequency.

Furthermore, while detecting the deflection angle of horizontal scanning mirror 21, the intensity of the drive signal input from horizontal scanning mirror driver 54 to horizontal scanning mirror 21 is increased. The deflection angle of horizontal scanning mirror 21 is adjusted to a prescribed deflection angle. If the deflection angle cannot be adjusted to the prescribed deflection angle, then laser driver 52 controls semiconductor laser 11 to stop emitting the laser beam.

After the deflection angle of horizontal scanning mirror 21 has been adjusted to the prescribed deflection angle, the phase difference between the signal input from horizontal scanning mirror driver 54 to horizontal scanning mirror 21 and the vibration of horizontal scanning mirror 21 is measured from the timing of the laser beam intensity modulation by modulator 13 and the output information of each detecting element of light detecting element array 32.

Thereafter, vertical scanning mirror 22 starts its scanning movement based on the vibration of horizontal scanning mirror 21, and video signal processing circuit 53 controls modulator 13 to modulate the intensity of the laser beam depending on the image to be projected. After the image has started to be projected, during the period after one frame of an image is displayed until the next frame of an image is displayed, the orientation of vertical scanning mirror 22 is fixed to cause the laser beam to scan light detecting element array 32, and the deflection angle of horizontal scanning mirror 21 is detected. If the deflection angle of horizontal scanning mirror 21 deviates from the prescribed value, then the drive signal from horizontal scanning mirror driver 54 is adjusted to adjust the deflection angle to the prescribed deflection angle. At this time, if the deflection angle cannot be adjusted to the prescribed deflection angle, laser driver 52 stops emitting the laser beam from semiconductor laser 11.

The laser projector according to the present exemplary embodiment is capable of detecting the deflection angle of horizontal scanning mirror 21 even if it is small, without the need for a light source for detecting the deflection angle of horizontal scanning mirror 21 in the form of a vibratory mirror, other than semiconductor laser 11 used for displaying images. When the deflection angle is adjusted at the time the laser projector starts to operate, i.e., when the operating frequency of horizontal scanning mirror 21 is adjusted to the resonant frequency thereof, since the deflection angle does not exceed the prescribed deflection angle, horizontal scanning mirror 21 is prevented from being broken due to being overdriven. As the deflection angle of horizontal scanning mirror 21 is detected and adjusted each time a frame is displayed, a stable scanning interval is achieved. If the deflection angle of horizontal scanning mirror 21 is not adjusted to the normal deflection angle, then no laser beam is projected from the laser projector. Accordingly, the laser projector is kept safe.

Figure 10:
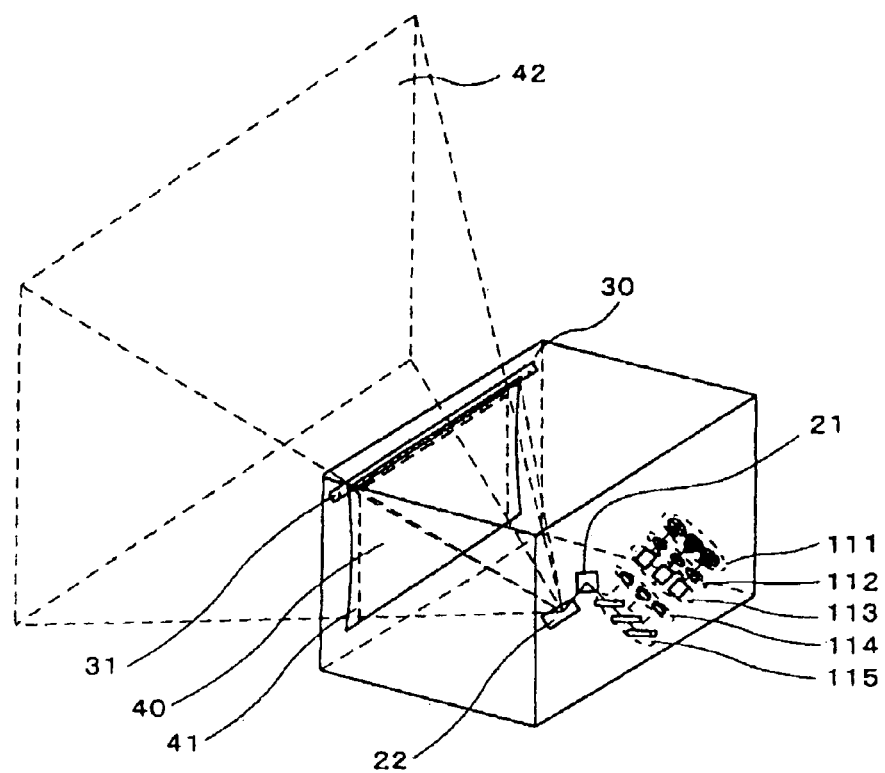
FIG. 10 is a perspective view showing another configurational example according to the first exemplary embodiment of the present invention.

In the above exemplary embodiment, the laser projector employs a single semiconductor laser as a laser light source. However, as shown in FIG. 10, a laser projector may comprise a plurality of semiconductor lasers 111 as light sources having different wavelengths, each of semiconductor lasers 111 being associated with condensing lens 112, modulator 113, and collimator lens 114. In FIG. 10, laser beams are propagated through respective paths and converted into parallel laser beams, which are combined by dichroic mirrors 115 into a laser beam that is deflected by horizontal scanning mirror 21 and vertical scanning mirror 22 to scan projection plane 42 two-dimensionally for projecting an image. Other structural details shown in FIG. 10 are identical to those shown in FIG. 6. The identical parts are denoted by identical reference numerals and will not be described in detail below.

Figure 11:
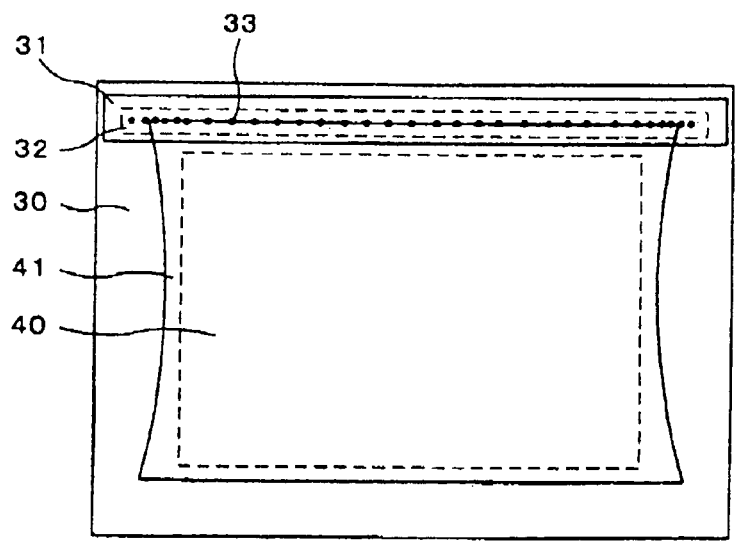
FIG. 11 is a plan view of a projection opening frame of a laser projector according to a second exemplary embodiment of the present invention, as viewed from within the laser projector.

A laser projector according to a second exemplary embodiment of the present invention will be described below. FIG. 11 is a plan view of a projection opening frame of the laser projector according to the second exemplary embodiment, as viewed from within the laser projector.

The present exemplary embodiment is different from the first exemplary embodiment in that the light detecting elements of the light detecting element array patterned on the transparent substrate are denser near positions where the deflection angle of the horizontal scanning mirror is the prescribed deflection angle.

As shown in FIG. 11, frame 30 of the laser projector has projection opening 30 defined therein for enabling the laser beam to pass therethrough. The laser beam scans scanning area 41 including projection opening 40. Projection opening 40 is of a rectangular shape, for example. Transparent substrate 31 made of glass, for example, is disposed along an upper edge of projection opening 40 in frame 30. An array of PIN photodiodes 33 each including a semiconductor layer in the form of an amorphous silicon film is disposed on transparent substrate 31. The array of PIN photodiodes 33 is patterned as light detecting element array 32 parallel to the horizontal scanning direction of the laser beam. According to the present exemplary embodiment, the detecting elements are denser at the ends of the array than at the center thereof.

Operation of the laser projector according to the second exemplary embodiment will be described below. When the laser projector starts up, it is set to cause the laser beam to scan light detecting element array 32. Specifically, the output signal from vertical scanning mirror driver 55 is controlled to fix the orientation of vertical scanning mirror 22 so as to cause the laser beam to scan light detecting element array 32.

Then, horizontal scanning mirror driver 54 starts the scanning movement of horizontal scanning mirror 21 with a signal intensity for preventing the deflection angle from exceeding the predetermined deflection angle even when the operating frequency of horizontal scanning mirror 21 and the resonant frequency thereof are brought into conformity with each other by horizontal scanning mirror driver 54. Laser driver 52 controls semiconductor laser 11 to start outputting the laser beam, and deflection angle detecting circuit 56 detects the deflection angle of horizontal scanning mirror 21 based on boundary information, from the output signal of light detecting element array 32, as to the boundary between an element which detects the laser beam and an element which does not defect the laser beam. While detecting the deflection angle of horizontal scanning mirror 21, the frequency of the drive signal input from horizontal scanning mirror driver 54 to horizontal scanning mirror 21 is changed. The drive frequency is adjusted to maximize the deflection angle of horizontal scanning mirror 21, thereby bringing the operating frequency into conformity with the resonant frequency.

Furthermore, while detecting the deflection angle of horizontal scanning mirror 21, the intensity of the drive signal input from horizontal scanning mirror driver 54 to horizontal scanning mirror 21 is increased. The deflection angle of horizontal scanning mirror 21 is adjusted to a prescribed deflection angle. If the deflection angle cannot be adjusted to the prescribed deflection angle, then laser driver 52 controls semiconductor laser 11 to stop emitting the laser beam.

After the deflection angle of horizontal scanning mirror 21 has been adjusted to the prescribed deflection angle, the phase difference between the signal input from horizontal scanning mirror driver 54 to horizontal scanning mirror 21 and the vibration of horizontal scanning mirror 21 is measured from the timing of the laser beam intensity modulation by modulator 13 and the output information of each detecting element of light detecting element array 32.

Thereafter, vertical scanning mirror 22 starts its scanning movement based on the vibration of horizontal scanning mirror 21, and video signal processing circuit 53 controls modulator 13 to modulate the intensity of the laser beam depending on the image to be projected. After the image has started to be projected, during the period after one frame of an image is displayed until the next frame of an image is displayed, the orientation of vertical scanning mirror 22 is fixed to cause the laser beam to scan the light detecting element array, and the deflection angle of horizontal scanning mirror 21 is detected. If the deflection angle of horizontal scanning mirror 21 deviates from the prescribed value, then the drive signal from horizontal scanning mirror driver 54 is adjusted to adjust the deflection angle to the prescribed deflection angle. At this time, if the deflection angle cannot be adjusted to the prescribed deflection angle, laser driver 52 stops emitting the laser beam from semiconductor laser 11.

The laser projector according to the present exemplary embodiment has the same advantages as the first exemplary embodiment, and is additionally capable of detecting the deflection angle of horizontal scanning mirror 21 with increased accuracy. This is because the folding positions of the laser beam in the horizontal reciprocating scanning process can be detected accurately by the light detecting elements that are disposed in a denser layout.

Figure 12:
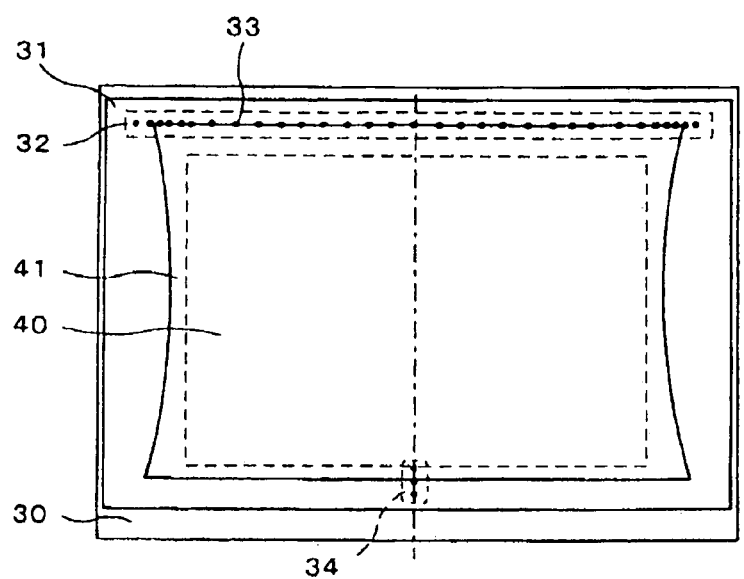
FIG. 12 is a plan view of a projection opening frame of a laser projector according to a third exemplary embodiment of the present invention, as viewed from within the laser projector.

A laser projector according to a third exemplary embodiment of the present invention will be described below. FIG. 12 is a plan view of a projection opening frame of the laser projector according to the third exemplary embodiment, as viewed from within the laser projector. The present exemplary embodiment is different from the second exemplary embodiment in that a transparent substrate is disposed in surrounding relation to an area scanned by the laser beam and in that light detecting elements for vertically scanning are patterned at a vertical scanning terminal end.

According to the present exemplary embodiment, as shown in FIG. 12, frame 30 of the laser projector has projection opening 30 defined therein for enabling the laser beam to pass therethrough. The laser beam scans scanning area 41 including projection opening 40. Transparent substrate 31 is disposed in surrounding relation to scanning area 41 scanned by the laser beam. An array of PIN photodiodes is disposed as light detecting element array 32 on transparent substrate 31 along an upper edge of projection opening 40 in frame 30 parallel to the horizontal scanning direction of the laser beam. PIN diodes are also disposed as light detecting elements 34 in a vertical scanning direction of the laser beam. Specifically, a plurality of (three in the illustrated embodiment) light detecting elements 34 are disposed along the vertical scanning direction of the laser beam centrally on a lower edge of projection opening 40 in transparent substrate 31. Light detecting elements 34 are positioned to detect the terminal end of the vertical scanning stroke of the laser beam.

A system for controlling operation of the laser projector will be described below with reference to FIG. 9. Deflection angle detecting circuit 56 detects the deflection angle of horizontal scanning mirror 21 from information output by light detecting element array 32, and also detects the deflection angle in the vertical scanning direction from information output by light detecting elements 34. Control circuit 51 acquires deflection angle information of horizontal scanning mirror 21 and deflection angle information of vertical scanning mirror 22 from deflection angle detecting circuit 56, and controls laser driver 52, video signal processing circuit 53, horizontal scanning mirror driver 54, and vertical scanning mirror driver 55. Laser driver 52 selectively turns on and off the laser beam output from semiconductor laser 11, and controls the laser beam so that it is output at a constant output level. Video signal processing circuit 53 inputs a signal to modulator 13 which controls the intensity of the laser beam that is to be output to horizontal scanning mirror 21. Horizontal scanning mirror driver 54 controls the frequency and intensity of a signal to be input to horizontal scanning mirror 21. Vertical scanning mirror driver 55 controls the intensity of a signal that is to be input to vertical scanning mirror 22.

Operation of the laser projector according to the present exemplary embodiment will be described below. When the laser projector starts up, it is set to cause the laser beam to scan light detecting element array 32. Specifically, the output signal from vertical scanning mirror driver 55 is controlled to fix the orientation of vertical scanning mirror 22 so as to cause the laser beam to scan light detecting element array 32.

Then, horizontal scanning mirror driver 54 starts the scanning movement of horizontal scanning mirror 21 using a signal intensity to prevent the deflection angle from exceeding the predetermined deflection angle even when the operating frequency of horizontal scanning mirror 21 and the resonant frequency thereof are brought into conformity with each other by horizontal scanning mirror driver 54. Laser driver 52 controls semiconductor laser 11 to start outputting the laser beam, and deflection angle detecting circuit 56 detects the deflection angle of horizontal scanning mirror 21 based on boundary information, from the output signal of light detecting element array 32, as to the boundary between an element which detects the laser beam and an element which does not defect the laser beam. While detecting the deflection angle of horizontal scanning mirror 21, the frequency of the drive signal input from horizontal scanning mirror driver 54 to horizontal scanning mirror 21 is changed. The drive frequency is adjusted to maximize the deflection angle of horizontal scanning mirror 21, thereby bringing the operating frequency into conformity with the resonant frequency.

Furthermore, while detecting the deflection angle of horizontal scanning mirror 21, the intensity of the drive signal input from horizontal scanning mirror driver 54 to horizontal scanning mirror 21 is increased. The deflection angle of horizontal scanning mirror 21 is adjusted to a prescribed deflection angle. If the deflection angle cannot be adjusted to the prescribed deflection angle, then laser driver 52 controls semiconductor laser 11 to stop emitting the laser beam.

After the deflection angle of horizontal scanning mirror 21 has been adjusted to the prescribed deflection angle, the phase difference between the signal input from horizontal scanning mirror driver 54 to horizontal scanning mirror 21 and the vibration of horizontal scanning mirror 21 is measured from the time when the intensity of the laser beam is modulated by modulator 13 and based on the output information of each detecting element of light detecting element array 32.

Then, vertical scanning mirror driver 55 inputs a signal to vertical scanning mirror 22 indicative of the terminal end of vertical scanning of the laser beam. Deflection angle detecting circuit 56 detects the deflection angle of vertical scanning mirror 22 from information output by vertical scanning light detecting elements 34. If the deflection angle of vertical scanning mirror 22 needs to be adjusted, the signal from vertical scanning mirror driver 55 is adjusted. After the adjustment, the scanning movement of vertical scanning mirror 22 is started based on the vibration of horizontal scanning mirror 21, and video signal processing circuit 53 controls modulator 13 to modulate the intensity of the laser beam depending on an image to be projected.

After the image has started to be projected, from the time when one image of an image is displayed until the time when the next frame of the image is displayed, the deflection angle of vertical scanning mirror 22 is detected by vertical scanning light detecting elements 34. If the deflection angle of vertical scanning mirror 22 needs to be adjusted, the signal from vertical scanning mirror driver 55 is adjusted. Thereafter, the orientation of vertical scanning mirror 22 is fixed in orientation to cause the laser beam to scan light detecting element array 32, and the deflection angle of horizontal scanning mirror 21 is detected. If the deflection angle of horizontal scanning mirror 21 deviates from the prescribed value, then the drive signal from horizontal scanning mirror driver 54 is adjusted to adjust the deflection angle to the prescribed deflection angle. At this time, if the deflection angle cannot be adjusted to the prescribed deflection angle, laser driver 52 stops emitting the laser beam from semiconductor laser 11.

The laser projector according to the present exemplary embodiment has the same advantages as the second exemplary embodiment, and is additionally capable of monitoring and adjusting the deflection angle of vertical scanning mirror 22.

Figure 13:
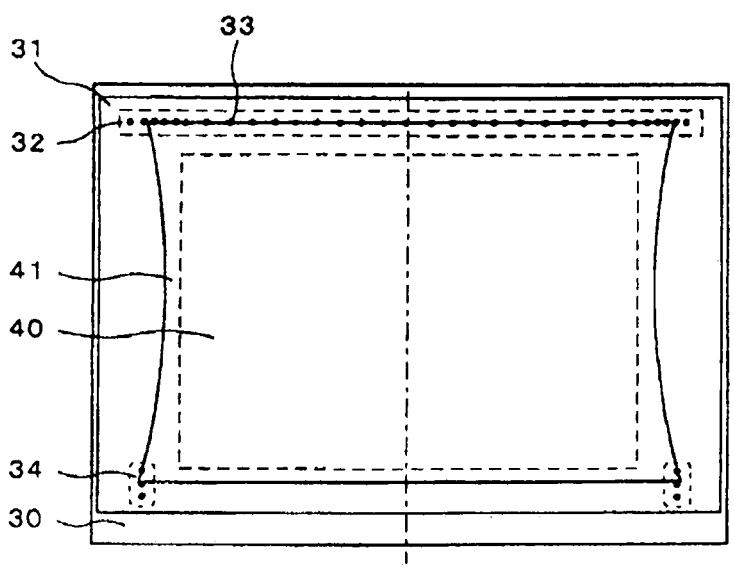
FIG. 13 is a perspective view showing another configurational example according to the third exemplary embodiment of the present invention.

In the above exemplary embodiment, the vertical scanning light detecting elements 34 are disposed centrally in the horizontal scanning stroke of the laser beam. However, vertical scanning light detecting elements 34 may be disposed in other positions. For example, as shown in FIG. 13, vertical scanning light detecting elements 34 may be disposed in terminal ends of the horizontal scanning stroke of the laser beam. Specifically, in FIG. 13, three vertical scanning light detecting elements 34 are disposed in each of two positions at the terminal ends of the horizontal scanning stroke of the laser beam. In addition, vertical scanning light detecting elements 34 are disposed along the vertical scanning direction of the laser beam so as to cover the lower terminal end of the vertical scanning stroke of the laser beam.

Figure 14:
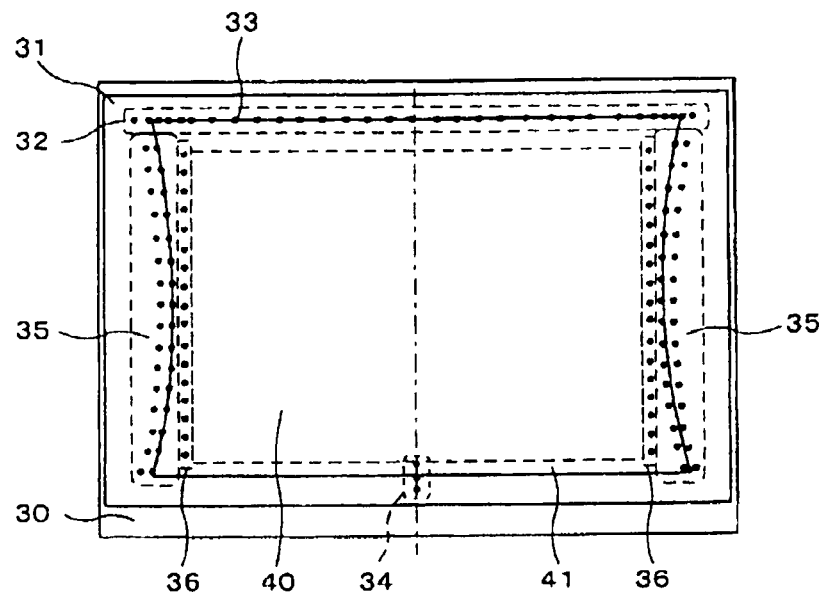
FIG. 14 is a plan view of a projection opening frame of a laser projector according to a fourth exemplary embodiment of the present invention, as viewed from within the laser projector.

A laser projector according to a fourth exemplary embodiment of the present invention will be described below. FIG. 14 is a plan view of a projection opening frame of the laser projector according to the fourth exemplary embodiment, as viewed from within the laser projector. The present exemplary embodiment is different from the third exemplary embodiment in that light detecting element arrays 35, 36 are patterned along left and right edges of projection opening 40 in transparent substrate 31.

According to the present exemplary embodiment, as shown in FIG. 14, frame 30 of the laser projector has projection opening 30 defined therein to enabling the laser beam to pass therethrough. The laser beam scans scanning area 41 including projection opening 40. Light detecting element array 32 is disposed on transparent substrate 31 along an upper edge of projection opening 40 parallel to the horizontal scanning direction of the laser beam. A plurality of (three in the illustrated embodiment) light detecting elements 34 are disposed along the vertical scanning direction of the laser beam centrally on a lower edge of projection opening 40. Light detecting element arrays 35 are disposed in scanning area 41 on transparent substrate 31 along left and right edges of projection opening 40. Light detecting element arrays 36 are also disposed on transparent substrate 31 along boundaries of scanning area 41 which extend from the ends of the horizontal scanning direction of the laser beam. Specifically, light detecting element arrays 36 are disposed in juxtaposed relation to light detecting element arrays 35, and disposed outwardly of light detecting element arrays 35 with respect to projection opening 40.

A system for controlling operation of the laser projector will be described below with reference to FIG. 9. Deflection angle detecting circuit 56 detects the deflection angle of horizontal scanning mirror 21 from information output by light detecting element array 32, and also detects the deflection angle in the vertical scanning direction from information output by light detecting elements 34. Deflection angle detecting circuit 56 also detects whether the deflection of horizontal scanning mirror 21 is normal or not based on information output from light detecting element arrays 35, 36. Control circuit 51 acquires deflection angle information of horizontal scanning mirror 21 and deflection angle information of vertical scanning mirror 22 from deflection angle detecting circuit 56, and controls laser driver 52, video signal processing circuit 53, horizontal scanning mirror driver 54, and vertical scanning mirror driver 55. Laser driver 52 selectively turns on and off the laser beam output from semiconductor laser 11, and controls the laser beam so that it is output at a constant output level. Video signal processing circuit 53 inputs a signal to modulator 13 which controls the intensity of the laser beam that is to be output to horizontal scanning mirror 21. Horizontal scanning mirror driver 54 controls the frequency and intensity of a signal to be input to horizontal scanning mirror 21. Vertical scanning mirror driver 55 controls the intensity of a signal to be input to vertical scanning mirror 22.

Operation of the laser projector according to the present exemplary embodiment will be described below. When the laser projector starts up, it is set to cause the laser beam to scan light detecting element array 32. Specifically, the output signal from vertical scanning mirror driver 55 is controlled to fix the orientation of vertical scanning mirror 22 so as to cause the laser beam to scan light detecting element array 32.

Then, horizontal scanning mirror driver 54 starts scanning the movement of horizontal scanning mirror 21 using the intensity of the signal to prevent the deflection angle from exceeding the predetermined deflection angle even when the operating frequency of horizontal scanning mirror 21 and the resonant frequency thereof are brought into conformity with each other by horizontal scanning mirror driver 54. Laser driver 52 controls semiconductor laser 11 to start outputting the laser beam, and deflection angle detecting circuit 56 detects the deflection angle of horizontal scanning mirror 21 based on boundary information, from the output signal of light detecting element array 32, as to the boundary between an element which detects the laser beam and an element which does not defect the laser beam. While detecting the deflection angle of horizontal scanning mirror 21, the frequency of the drive signal input from horizontal scanning mirror driver 54 to horizontal scanning mirror 21 is changed. The drive frequency is adjusted to maximize the deflection angle of horizontal scanning mirror 21, thereby bringing the operating frequency into conformity with the resonant frequency.

Furthermore, while detecting the deflection angle of horizontal scanning mirror 21, the intensity of the drive signal input from horizontal scanning mirror driver 54 to horizontal scanning mirror 21 is increased. The deflection angle of horizontal scanning mirror 21 is adjusted to a prescribed deflection angle. If the deflection angle cannot be adjusted to the prescribed deflection angle, then laser driver 52 controls semiconductor laser 11 to stop emitting the laser beam.

After the deflection angle of horizontal scanning mirror 21 has been adjusted to the prescribed deflection angle, the phase difference between the signal input from horizontal scanning mirror driver 54 to horizontal scanning mirror 21 and the vibration of horizontal scanning mirror 21 is measured from the time when the intensity of the laser beam modulated by modulator 13 and based on the output information of each detecting element of light detecting element array 32.

Then, vertical scanning mirror driver 55 inputs a signal to vertical scanning mirror 22 indicative of the terminal end of vertical scanning of the laser beam. Deflection angle detecting circuit 56 detects the deflection angle of vertical scanning mirror 22 from information output by vertical scanning light detecting elements 34. If the deflection angle of vertical scanning mirror 22 needs to be adjusted, the signal from vertical scanning mirror driver 55 will be adjusted. After adjustment, the scanning movement of vertical scanning mirror 22 is started based on the vibration of horizontal scanning mirror 21, and video signal processing circuit 53 controls modulator 13 to modulate the intensity of the laser beam depending on the image to be projected.

After the image has started to be projected, during horizontal blanking periods before and after an image is output along one horizontal scanning line, monitoring occurs to determine whether or not the deflection angle of horizontal scanning mirror 21 is the prescribed deflection angle based on information output from light detecting element arrays 35. If the deflection angle of horizontal scanning mirror 21 is smaller than the prescribed deflection, then it is further detected whether or not the laser beam is deflected to light detecting element arrays 36 based on information output from light detecting element arrays 36. If the laser beam is detected as being not deflected to light detecting element arrays 36, then laser driver 52 controls semiconductor laser 11 to stop emitting the laser beam.

From the time when one frame of an image is displayed until the time when the next frame of the image is displayed, the deflection angle of vertical scanning mirror 22 is detected by vertical scanning light detecting elements 34. If the deflection angle of vertical scanning mirror 22 needs to be adjusted, the signal from vertical scanning mirror driver 55 will be adjusted. Thereafter, the orientation of vertical scanning mirror 22 is fixed to cause the laser beam to scan light detecting element array 32, and the deflection angle of horizontal scanning mirror 21 is detected. If the deflection angle of horizontal scanning mirror 21 deviates from a prescribed value, then the drive signal from horizontal scanning mirror driver 54 will be adjusted to adjust the deflection angle to the prescribed deflection angle. At this time, if the deflection angle cannot be adjusted to the prescribed deflection angle, laser driver 52 will stop emitting the laser beam from semiconductor laser 11.

The laser projector according to the present exemplary embodiment has the same advantages as the third exemplary embodiment, and is additionally capable of instantaneously cutting off the laser beam when the deflection angle of the horizontal scanning mirror becomes abnormal. As vertical scanning light detecting elements 34 and horizontal scanning light detecting elements 35, 36, for detecting the laser beam at the time that images are projected, are fabricated on the same transparent substrate 31, in addition to light detecting element array 32, the deflection angle of vertical scanning mirror 22 and the deflection angle of horizontal scanning mirror 21, at the time that images are projected, can be detected without the need for an increased number of parts.

Figure 15:
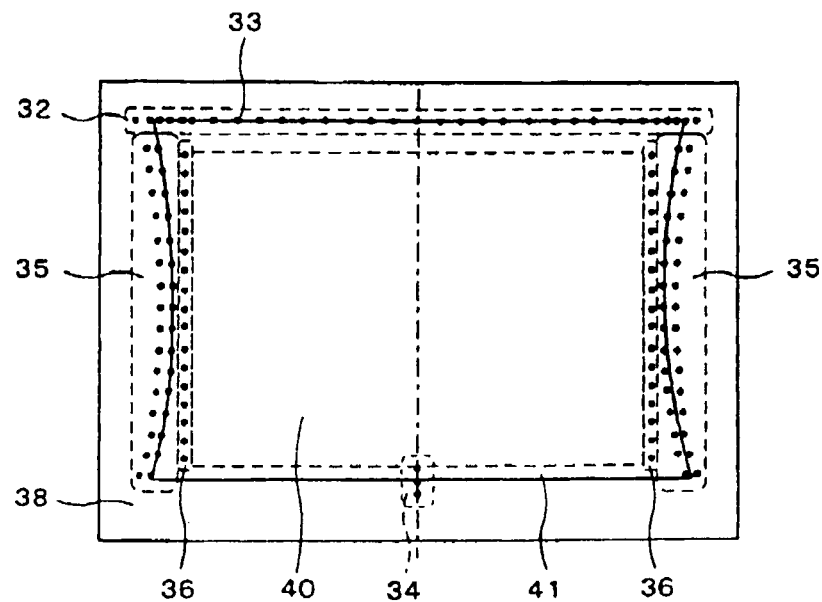
FIG. 15 is a plan view of a projection opening frame of a laser projector according to a fifth exemplary embodiment of the present invention, as viewed from within the laser projector.

A laser projector according to a fifth exemplary embodiment of the present invention will be described below. FIG. 15 is a plan view of a projection opening frame of the laser projector according to the fifth exemplary embodiment, as viewed from within the laser projector.

As shown in FIG. 15, the laser projector according to the present exemplary embodiment has a frame comprising a metal film such as Cr (chromium) deposited on transparent substrate 38. The metal film is partly etched away to form projection opening 40 therein. The surface of the metal film faces outwardly of the laser projector. Light detecting element arrays 32, 34, 35, 36 are patterned on the surface of transparent substrate 38 that is opposite to the surface thereof on which the metal film is disposed, in the same manner as with the fourth embodiment. In other words, the semiconductor layers of the light detecting element arrays are disposed so as to face inwardly of the laser projector.

The laser projector according to the present exemplary embodiment has the same advantages as the fourth exemplary embodiment, and is additionally advantageous in that since transparent substrate 38 is constructed as a main frame body, the number of parts used is reduced and the parts are positioned with ease.

According to Patent document 3, the photodetector for detecting the folding position of the deflected light beam is provided in the light deflector, and the resonant frequency of the deflecting means in the light deflector is detected by the photodetector. The photodetector comprises a line sensor having a plurality of light detecting areas. According to Patent document 3, however, the line sensor is disposed in a range smaller than the range of the deflection angle of the laser beam to be adjusted, i.e., in a portion of the range of the deflection angle. While this background art is effective to initially adjust the deflection angle before an image starts to be projected because of the process of detecting the deflection angle and the process of adjusting the resonant frequency, the background art is difficult to apply to the adjustment of the deflection angle after an image has started to be projected. According to the present invention, the light detecting element array is disposed in a range wider than the range of the deflection angle of the laser beam to be adjusted, making it possible to adjust the deflection angle for each interframe interval even after an image has started to be projected.

The present application claims Priority based on Japanese patent application No. 2006-250324 filed on Sep. 15, 2006, and incorporates herein all the contents disclosed therein.

The invention claimed is:

1. A laser projector comprising:
a light source for emitting a laser beam;
a modulator for modulating the intensity of the laser beam depending on an image to be projected;
a vibratory mirror vibratable for horizontally deflecting the laser beam whose intensity has been modulated;
a vertical scanning mirror for vertically deflecting the laser beam whose intensity has been modulated;
a deflection angle detector for detecting a deflection angle of said vibratory mirror; and
a deflection angle adjuster for adjusting the deflection angle of said vibratory mirror based on the detected deflection angle of said vibratory mirror;
wherein said deflection angle detector includes a light detecting element array comprising a plurality of light detecting elements arrayed parallel to a horizontally scanning direction along which the laser beam is deflected by said vibratory mirror, said light detecting element array being disposed outside of an image projection area, said light detecting element array including a first light detecting element region, at least both ends of said first light detecting element region disposed outside of the entire horizontal range scanned by the laser beam in a horizontal direction, and including a second light detecting element region disposed inside of the entire horizontal range scanned by the laser beam in a horizontal direction.

2. The laser projector according to claim 1, wherein the light detecting elements of said light detecting element array are not arrayed at equally spaced intervals.

3. The laser projector according to claim 2, wherein the light detecting elements of said light detecting element array are denser at ends of the light detecting element array than at a center thereof.

4. The laser projector according to claim 3, wherein said light detecting element array comprises a semiconductor layer disposed on a transparent substrate.

5. The laser projector according to claim 2, wherein said light detecting element array comprises a semiconductor layer disposed on a transparent substrate.

6. The laser projector according to claim 1, wherein said light detecting element array comprises a semiconductor layer disposed on a transparent substrate.

7. The laser projector according to claim 1, wherein said deflection angle adjuster adjusts the frequency and intensity of a drive signal for said vibratory mirror.

8. The laser projector according to claim 7, wherein said deflection angle adjuster adjusts the deflection angle of said vibratory mirror by bringing the frequency of the drive signal for said vibratory mirror into conformity with the resonant frequency of the vibratory mirror and thereafter varying the intensity of the drive signal for said vibratory mirror.

9. The laser projector according to claim 1, wherein when the deflection angle of said vibratory mirror is adjusted, the orientation of said vertical scanning mirror is fixed to cause said laser beam to horizontally scan said light detecting element array.

10. The laser projector according to claim 1, wherein the deflection angle of said vibratory mirror is detected and adjusted by said deflection angle adjuster for each vertical blanking period.

11. A laser projector comprising:
a light source for emitting a laser beam;
a modulator for modulating the intensity of the laser beam depending on an image to be projected;
a vibratory mirror vibratable for horizontally deflecting the laser beam whose intensity has been modulated;
a vertical scanning mirror for vertically deflecting the laser beam whose intensity has been modulated;
a first deflection angle detector for detecting a deflection angle of said vibratory mirror;
a first deflection angle adjuster for adjusting the deflection angle of said vibratory mirror based on the detected deflection angle of said vibratory mirror;
a second deflection angle detector for detecting a deflection angle of said vertical scanning mirror; and
a second deflection angle adjuster for adjusting the deflection angle of said vertical scanning mirror based on the detected deflection angle of said vertical scanning mirror;
wherein said first deflection angle detector includes a first light detecting element array comprising a plurality of light detecting elements arrayed parallel to a horizontally scanning direction along which the laser beam is deflected by said vibratory mirror, said first light detecting element array being disposed outside of an image projection area, said first light detecting element array including a first light detecting element region, at least both ends of said first light detecting element region disposed outside of the entire horizontal range scanned by the laser beam in a horizontal direction, and including a second light detecting element region disposed inside of the entire horizontal range scanned by the laser beam in a horizontal direction, and wherein said second deflection angle detector includes a plurality of light detecting elements disposed outside of the image projection area and disposed so as to cover a terminal end of a vertical scanning stroke of the laser beam.

12. The laser projector according to claim 11, wherein said first light detecting element array of said first deflection angle adjuster and said light detecting elements of said second deflection angle adjuster comprise respective semiconductor layers disposed on one transparent substrate.

13. The laser projector according to claim 12, wherein a metal film deposited on said transparent substrate is etched to form a projection opening therein for enabling the laser beam to pass therethrough.

14. The laser projector according to claim 12, wherein a metal film deposited on said transparent substrate is etched to form a projection opening therein for enabling the laser beam to pass therethrough.

* * * * *

UNITED STATES PATENT AND TRADEMARK OFFICE
CERTIFICATE OF CORRECTION

PATENT NO.         : 8,519,324 B2
APPLICATION NO.    : 12/310481
DATED              : August 27, 2013
INVENTOR(S)        : Shunji Tsuida It is certified that error appears in the above-identified patent and that said Letters Patent is hereby corrected as shown below:

On the Title Page, (75) Inventor: -- Shinji Tsuida, Tokyo (JP) -- should read as "Shunji Tsuida, Tokyo (JP)"

Signed and Sealed this
Fifth Day of November, 2013

Teresa Stanek Rea
*Deputy Director of the United States Patent and Trademark Office*

UNITED STATES PATENT AND TRADEMARK OFFICE
CERTIFICATE OF CORRECTION

PATENT NO. : 8,519,324 B2
APPLICATION NO. : 12/310481
DATED : August 27, 2013
INVENTOR(S) : Shinji Tsuida It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 716 days.

Signed and Sealed this

Fifteenth Day of September, 2015

Michelle K. Lee
*Director of the United States Patent and Trademark Office*